US006663971B1

(12) United States Patent
Falcone

(10) Patent No.: US 6,663,971 B1
(45) Date of Patent: *Dec. 16, 2003

(54) BRANCHED PERFLUORO POLYETHYLENE GLYCOL (PF-PEG) HIGH PERFORMANCE THIN FILM DISK LUBRICANTS

(75) Inventor: Samuel J. Falcone, San Jose, CA (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,048

(22) Filed: Jul. 20, 1998

Related U.S. Application Data

(60) Provisional application No. 60/067,846, filed on Dec. 5, 1997.

(51) Int. Cl.$^7$ ................................................. G11B 5/725
(52) U.S. Cl. ................ 428/421; 428/694 TF; 427/131
(58) Field of Search .......................... 428/421, 694 TF, 428/900; 508/582; 427/131

(56) References Cited

U.S. PATENT DOCUMENTS

| 4,788,350 A | * | 11/1988 | Lagow ........................ 568/677 |
| 4,960,951 A | * | 10/1990 | Nappa et al. ................ 568/615 |
| 5,128,216 A | * | 7/1992 | Ng .............................. 428/695 |
| 5,498,359 A | * | 3/1996 | Shinomoto et al. ........... 252/54 |
| 5,725,945 A | * | 3/1998 | Kohno et al. ................ 428/341 |
| 5,874,169 A | * | 2/1999 | Falcone ....................... 428/421 |
| 5,962,141 A | * | 10/1999 | Falcone ....................... 428/422 |
| 6,019,909 A | * | 2/2000 | Ide et al. ...................... 252/70 |

* cited by examiner

*Primary Examiner*—Stevan A. Resan
(74) *Attorney, Agent, or Firm*—McDermott, Will & Emery

(57) ABSTRACT

A non-linear perluoro polyalkylene or perfluoro polyarylene glycol of specific molecular conformation such as plate-like, spherical, or helical and having the formula $CF_x-[-(-RO-)_n-CF_3]_{4-x}$, wherein R is a $C_1-C_{10}$ linear or branched, substituted or unsubstituted fluoroalkyl or perfluoroalkyl group, or a substituted or unsubstituted fluoroaryl or perfluoroaryl group; x is an integer from 0 to 2; and n is a number between about 1 to about 20 is provided as a lubricant topcoat on a magnetic recording medium. The inventive lubricants are stable and provide increased bonded lube ratios compared to those of conventional lubricants.

9 Claims, 2 Drawing Sheets

BRANCHED PERFLUORO POLYETHYLENE GLYCOL (PF-PEG) HIGH PERFORMANCE THIN FILM DISK LUBRICANTS

CROSS-REFERENCE TO PROVISIONAL APPLICATION

This application claims priority from provisional patent application Ser. No. 60/067,846, filed Dec. 5, 1997, the entire disclosure of which is hereby incorporated herein by reference.

TECHNICAL FIELD

The present invention relates to the recording, storage and reading of magnetic data, particularly rotatable magnetic recording media, such as thin film magnetic disks having smooth or textured surfaces and a lubricant topcoat for contact with cooperating magnetic transducer heads.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk, where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk, and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

A typical longitudinal recording medium is depicted in FIG. 1 and comprises a substrate 10, typically an aluminum (Al)-alloy, such as an aluminum-magnesium (Al—Mg) -alloy, plated with a layer of amorphous nickel-phosphorus (NiP). Alternative substrates include glass, glass-ceramic materials and graphite. Substrate 10 typically contains sequentially deposited on each side thereof a chromium (Cr) or Cr-alloy underlayer 11, 11', a cobalt (Co)-base alloy magnetic layer 12, 12', a protective overcoat 13, 13', typically containing carbon, and a lubricant topcoat 14, 14'. Cr underlayer 11, 11' can be applied as a composite comprising a plurality of sub-underlayers 11A, 11A'. Cr underlayer 11, 11', Co-base alloy magnetic layer 12, 12' and protective overcoat 13, 13', typically containing carbon, are usually deposited by sputtering techniques performed in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective layer to prevent wear between the disk and head interface during drive operation. Excessive wear of the protective overcoat, typically comprising carbon, increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

A significant factor in the performance of a lubricant topcoat is the amount of lubricant which tightly adheres to the magnetic recording media. The amount of adhering lubricant is described by the "bonded lube ratio" which is the ratio of the amount of lubricant directly bonded to the magnetic recording media vis-à-vis the total amount of originally applied lubricant. The portion of lubricant which is not tightly bound and easily removed by immersion of the recording media in a solvent is referred to as the "mobile lubricant".

Another significant factor in the performance of a lubricant topcoat is the ability of the lubricant to resist decomposition over time, particularly decomposition by acid catalysis. For example, lubricants that resist catalytic cleavage by Lewis acids provide improved tribology under stress conditions.

Despite the importance of lubricity in recording media, few commercial lubricants are available that satisfy the demanding criteria of a lubricant topcoat. Typical conventional lubricants, such as perfluoroalkylpolyether fluids such as PFPE-1, PFPE-2, PFPE-3, PFPE-4, do not have optimal molecular structure and molecular conformation considered necessary for high bonded lube ratio as well as resistance to mainchain catalytic degradation and thermal stability.

The degree of direct bonding or bonded lube ratio is, in part, dependent upon the particular material employed for the protective overcoat and the molecular conformation of the lubricant in relation to the surface topography of the recording media. Desirably, the bonded lube ratio should be controllable to realize a meaningful improvement in stiction and wear performance of the resulting magnetic recording medium.

In view of the criticality of the lubricant topcoat, there is a continuing need for improved bonding of the lubricant to the magnetic recording media, particularly to a protective carbon overcoat. There is also a need for lubricants for use as topcoats in the manufacture of recording media with improved resistance to degradation and improved tribology under stress conditions.

DISCLOSURE OF THE INVENTION

An advantage of the present invention is stable, non-linear perfluoropolyalkylene or perfluoro polyarylene glycol lubricants of specific molecular conformations.

Another advantage of the present invention is a method of making a non-linear perfluoro polyalkylene or perfluoro polyarylene lubricants of specific molecular conformations.

A further advantage of the present invention is a magnetic recording medium comprising a lubricant topcoat bonded thereto at a high bonded lube ratio, wherein the lubricant comprises a stable, non-linear perfluoro polyalkylene or perfluoro polyarylene glycol of specific molecular conformation.

A still further object of the present invention is a method of manufacturing a magnetic recording medium comprising a lubricant topcoat having a high bonded lube ratio, wherein the lubricant comprises a stable, non-linear perfluoro polyalkylene or perfluoro polyarylene glycol of specific molecular conformation.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a magnetic recording medium comprising a lubricant topcoat, wherein the lubricant is a non-linear perfluoro polyalkylene or perfluoro polyarylene glycol of specific molecular conformation.

Another aspect of the present invention is lubricants comprising non-linear perfluoro polyalkylene. or perfluoro polyarylene glycols of specific molecular conformations and having the formula:

$$CF_x-[-(-RO-)_n-CF_3]_{4-x},$$

wherein:
R is a $C_1$–$C_{10}$ linear or branched, substituted or unsubstituted fluoroalkyl or perfluoroalkyl group, or a substituted or unsubstituted fluoroaryl or perfluoroaryl group; x is an integer from 0 to 2; and n is a number between about 1 and about 20.

A further aspect of the present invention is a method of producing non-linear perfluoro polyalkylene or perfluoro polyarylene glycol lubricants of specific molecular conformations, which method comprises the steps of:

(a) providing a non-linear polyalkylene or polyarylene compound selected from compounds having the formula:

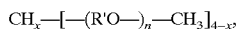
$$CH_x-[-(R'O-)_n-CH_3]_{4-x},$$

wherein:
R' is a $C_1$–$C_{10}$ linear or branched, substituted or unsubstituted alkyl group, or a substituted or unsubstituted aryl group; x is an integer from 0 to 2; n is a number between about 1 to about 20; and (b) reacting the polyalkylene or polyarylene compound with a sufficient amount of fluorine under conditions and for a time sufficient to fluorinate same to form a non-linear perfluoro polyalkylene or perfluoro polyarylene glycol lubricant compound having the formula:

$$CF_x-[-(-RO)_n-CF_3]_{4-x},$$

wherein:
R is a $C_1$–$C_{10}$ linear or branched, substituted or unsubstituted fluoroalkyl or perfluoroalkyl group, or a substituted or unsubstituted fluoroaryl or perfluoroaryl group; x is an integer from 0 to 2; and n is a number between about 1 to about 20.

A still further aspect of the present invention is a method of manufacturing a magnetic recording medium, which method comprises depositing a magnetic layer on a substrate and then applying a solution of a lubricant to the surface of the magnetic layer or a protective overcoat thereon to form a lubricant topcoat, wherein the lubricant comprises a non-linear perfluoropolyalkylene or perfluoro polyarylene glycol of specific molecular conformation and having the formula:

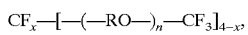
$$CF_x-[-(-RO-)_n-CF_3]_{4-x},$$

wherein:
R is a $C_1$–$C_{10}$ linear or branched, substituted or unsubstituted fluoroalkyl or perfluoroalkyl group, or a substituted or unsubstituted fluoroaryl or perfluoroaryl group; x is an integer from 0 to 2; and n is a number between about 1 to about 20.

Additional objects and advantages of the present invention will become readily apparent to those having ordinary skill in the art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

The present invention stems from the discovery that certain non-linear perfluoro polyalkylene or perfluoro polyarylene glycols of specific molecular conformations, when used as lubricant topcoats, lead to unexpected and considerable improvements in the performance of magnetic media.

The present invention is directed to a class of lubricants which can be advantageously employed as lubricant topcoats on magnetic recording media with a controlled degree of direct bonding to the magnetic recording media, especially to a protective overcoat. The lubricants of the present invention can be bonded in a controlled manner to various protective overcoat materials, including carbon, silicon dioxide, hydrogenated carbon, nitrogenated carbon, or graphitic carbon. A particularly advantageous characteristic of the inventive class of lubricants is that their molecular conformation can be tailored to achieve a controlled affinity for a particular topcoat material and surface topography, thereby providing a controlled bonded lube ratio. Consequently, the inventive class of lubricants can be applied to various protective topcoat materials with a controlled bonded lube ratio and attendant reduction in stiction while providing an increase in wear resistance and durability.

The lubricant topcoats according to the present invention comprise stable, non-linear perfluoro polyalkylene or perfluoro polyarylene glycols of specific molecular conformations and have the following formula:

$$CF_x\text{—}[\text{—}(\text{—RO—})_n\text{—}CF_3]_{4-x},$$

wherein R is a $C_1$–$C_{10}$ linear or branched, substituted or unsubstituted fluoroalkyl or perfluoroalkyl group, or a substituted or unsubstituted fluoroaryl or perfluoroaryl group; x is an integer from 0 to 2; and n is a number between about 1 to about 20, preferably about 1 to about 5.

Figure 2:
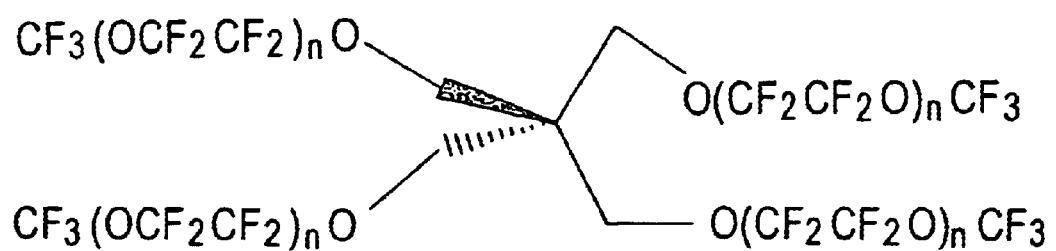
FIG. 2 is a molecular conformational representation of a 4-armed embodiment of the present invention.
Figure 3:
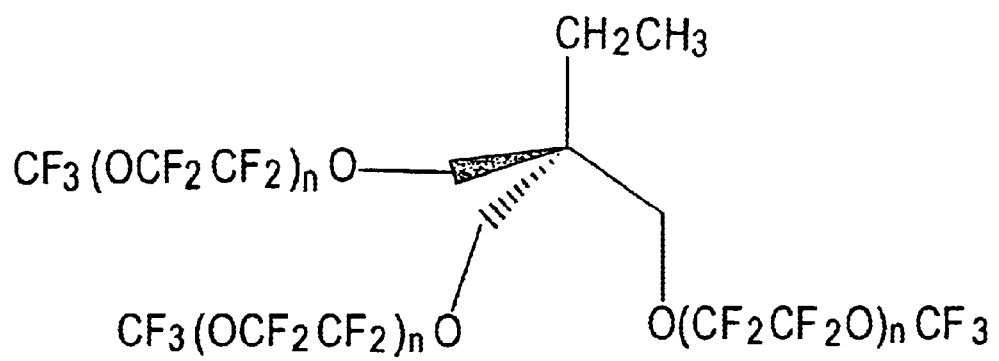
FIG. 3 is a molecular conformational representation of another embodiment of the present invention.

Non-linear polymer compounds of the above formula are termed "star polymers" and are characterized in terms of the number of "arms" they possess. The number of "arms" is determined by the subscript 4–x in the above formula and can range from –2 to 4. The structural conformation of the polymer is determined by the number of arms, e.g., a 4-armed polymer of the above formula has a flat planar or plate-like structure as illustrated in FIG. 2, whereas a 3-armed polymer of the above formula has a more spherically shaped structure as illustrated in FIG. 3. 2-armed polymers of the above formula generally have a helical type structure.

The 4-armed plate-like lubricant compounds of the present invention are especially suitable for use with smooth-surfaced recording media because the flat planar structure provides maximal surface area for direct bonding of the lubricant to the media surface, thus providing optimal lubricant performance and a high bonded lube ratio.

By contrast, the 3-armed spherically shaped lubricants of the present invention are especially suitable for use with textured media surfaces, wherein the molecular size (e.g., radius) is selected for optimal direct bonding area for a given texture in order to provide a high bonded lube ratio.

In a preferred embodiment, R is fluoroethylene, —(—$CF_2CF_2$—)—, and the lubricant is a perfluoro polyethylene glycol (PF-PEG). An example of a 4-armed, plate-like PF-PEG, where x=0, is C—[—$CF_2CF_2O$—)$_n$—$CF_3$]$_4$, the molecular conformation of which is illustrated in FIG. 2. When n is about 3, the thickness of the plate-like conformation is about 10 Å and the diameter about 18 Å. These dimensions can be varied as desired by appropriate selection of the value of n as required for optimal bonding to a variety of media surface topographies.

An example of a 3-armed, more spherically shaped PF-PEG obtained when x=1 is C—(—$CF_2CF_2O$—)$_n$—$CF_3$]$_3$, the molecular conformation of which is illustrated in FIG. 3. When n is about 3, a diameter of about 16 Å is obtained. As before, the diameter can be tailored to a specific value by appropriately selecting the value of n.

An example of a 2-armed lubricant molecule according to the present invention is $CF_2$—[—(—$CF_2CF_2O$—)$_n$—$CF_3$]$_2$, the molecular conformation of which is generally a helical cylinder with a length of about 16 Å when n is about 10. The dimensions of such molecular conformations are also variable upon selection of the value n appropriate for optimal bonding with media surfaces of particular topography.

Preferably, the PF-PEG lubricants according to the present invention have an average molecular weight of about 300 to about 10,000 a.m.u., more preferably about 500 to about 5,000 a.m.u.

PF-PEG lubricants with a narrow molecular weight distribution are more preferable. The molecular weight distribution can be measured by a variety of conventional techniques including Gel Permeation Chromatography (GPC) The molecular weight distribution of a polymer is determined by the ratio of the weight average (Mw) to number average (Mn) molecular weight of a given polymer. The Mw/Mn value of a given polymer is referred to as its polydispersity index.

Preferably, the PF-PEG lubricants of the invention have a polydispersity index of about 1.0 to about 1.5, more preferably less than about 1.2, and most preferably less than about 1.1.

The inventive lubricants can be prepared by a method which comprises providing a non-linear polyalkylene or polyarylene glycol selected from compounds having the formula:

$$CH_x\text{—}[\text{—}(\text{—R'O—})_n\text{—}CH_3]_{4-x},$$

wherein R' is a $C_1$–$C_{10}$ linear or branched, substituted or unsubstituted alkyl group, or a substituted or unsubstituted aryl group, x is an integer from 0 to 2; n is a number between about 1 to about 20, preferably about 1 to about 5; and reacting the polyalkylene or polyarylene glycol compound with a sufficient amount of fluorine under conditions and for a time sufficient to fluorinate the glycol compound to form a non-linear perfluoro polyalkylene or perfluoro polyarylene glycol lubricant compound having the formula:

$$CF_x\text{—}[\text{—}(RO)_n\text{—}CF_3]_{4-x},$$

wherein R is a $C_1$–$C_{10}$ linear or branched, substituted or unsubstituted fluoroalkyl or perfluoroalkyl group, or a substituted or unsubstituted fluoroaryl or perfluoroaryl group; x is an integer from 0 to 2; and n is a number between about 1 to about 20, preferably about 1 to about 5.

Fluorination of the polyalkylene or polyarylene glycol starting materials may be accomplished by conventional techniques, such as are disclosed in U.S. Pat. Nos. 4,755, 567; 5,093,432; 5,506,309; and 5,539,059; the entire disclosures of which are incorporated herein by reference. A particularly suitable technique comprises treating the polyalkyl or polyaryl glycol compound with a sufficient amount of gaseous elemental fluorine under conditions and for a time sufficient to result in fluorination thereof.

In a preferred embodiment, R' is ethylene, —(—$CH_2CH_2$—)—, R is fluoroethylene, —($CF_2CF_2$—)—, and the lubricant is a perfluoro polyethylene glycol (PF-PEG) compound. When the value of n is in the range of about 1 to about 20, preferably about 1 to about 5, average molecular weights in the range of about 300 a.m.u. to about 10,000 a.m.u., preferably about 500 a.m.u. to about 5,000 a.m.u., are obtained.

Preferably, the PF-PEG lubricants of the invention have a low polydispersity index of less than about 1.2, more preferably less than about 1.1. A low polydispersity index may be obtained by fractionating the product, as by distillation or chromatography.

The lubricant topcoat of the present invention can be applied to a magnetic recording medium, either on the magnetic layer or on a conventionally applied protective overcoat, particularly a carbon overcoat. In an embodiment of the present invention, the lubricant is dissolved in a conventional hydrofluorocarbon solvent, such as PF-5060 (3M Corp.), HFE-7100 AK225 (3M Corp.), Freon TA®, or Vertrel-XF (Dupont), in a ratio of about 0.0001% to about 100% by (weight/weight), preferably about 0.0005% to about 0.5%, more preferably about 0.001% to about 0.01%.

A typical magnetic recording medium, for example, a composite comprising a non-magnetic substrate having sequentially deposited on each side thereof an underlayer, a magnetic layer, and a protective carbon overcoat, is immersed in the lubricant solution for a predetermined period and then slowly withdrawn therefrom at a rate of about 1 mm/sec. to about 10 mm/sec., followed by drying. In practicing the present invention, one can employ a conventional lifter-type dipper to immerse the composite in the lubricant solution.

One having ordinary skill in the art can easily optimize the duration of immersion and the speed of withdrawal to achieve a desired coating thickness. Excess lubricant can be removed from the medium upon withdrawal from the lubricant solution, as by hand or mechanical wiping prior to drying. While elevated temperatures are not necessary during the immersion step, it may be advantageous to heat the lubricant solution to a temperature of about 25° C. to about 60° C., preferably about 40° C. during the immersion step. Coating thicknesses ranging from about 10 Å to about 100 Å can be obtained by the above process, depending upon the solution formulation, temperature, and wipe procedure.

Figure 1:
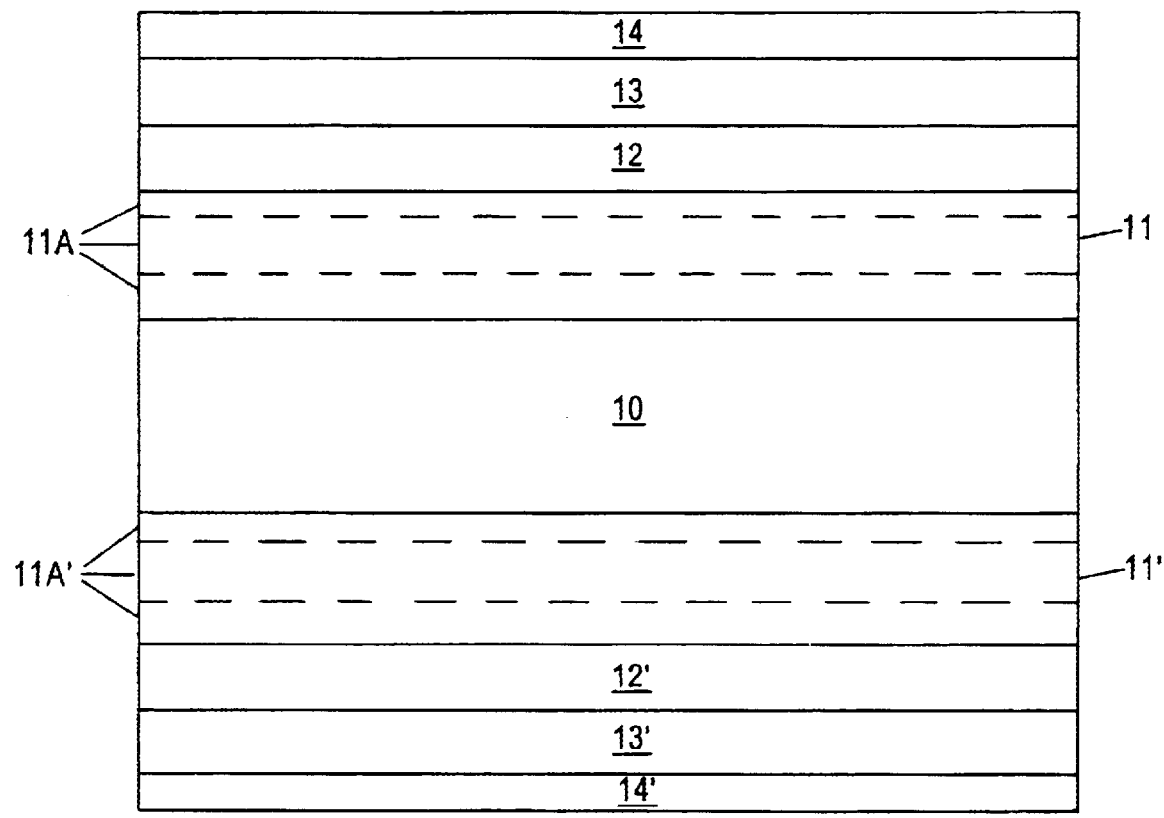
FIG. 1 schematically depicts a magnetic recording medium structure to which the present invention is applicable.

The present invention is not limited to any particular type of magnetic recording medium, but can be employed in any of various magnetic recording media, including those wherein the substrate or a subsequently deposited layer has been textured, as by mechanical treatment or laser techniques, and the textured surface substantially reproduced on subsequently deposited layers. Thus, a lubricant prepared in accordance with the present invention, can be applied to form a topcoat, such as topcoat 14 on the magnetic recording media depicted in FIG. 1, but not necessarily limited thereto.

Only the preferred embodiments of the invention are shown and described in the present disclosure. It is to be understood that the invention is capable of use in various other combinations and environments and is capable of changes or modifications within the scope of the inventive concept as expressed herein.

What is claimed is:

1. A magnetic recording medium comprising a lubricant topcoat, wherein the lubricant is a 3-arm or 4-arm fluoropolyether having a formula:

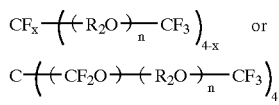

wherein $R_2$ is perfluoroethylene;

x is 1; and n is 1 to about 20.

2. The magnetic recording medium according to claim 1, comprising:

a substrate;

a magnetic layer on the substrate; and the lubricant topcoat on the magnetic layer.

3. The magnetic recording medium according to claim 2, further comprising:

an underlayer on the substrate, and the magnetic layer is on the underlayer.

4. The magnetic recording medium according to claim 3, further comprising a protective overcoat on the magnetic layer, and the lubricant topcoat is on the protective overcoat.

5. The magnetic recording medium according to claim 1, wherein the lubricant is:

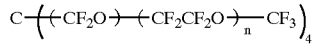

wherein n is 1 to about 20.

6. A method of manufacturing a magnetic recording medium, which method comprises depositing a magnetic layer on a substrate and then applying a solution of a lubricant to the surface of the magnetic layer to form a lubricant topcoat thereon, wherein the lubricant comprises a 3-arm or 4-arm fluoropolyether having a formula:

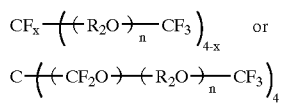

wherein $R_2$ is perfluoroethylene;

x is 1; and n is 1 to about 20.

7. The method according to claim 6, wherein the lubricant solution comprises an organic solvent and less than about 0.05% by weight of the lubricant and the lubricant topcoat is about 15 Å to about 30 Å thick.

8. The method according to claim 6, wherein a protective overcoat comprising carbon, silicon dioxide, hydrogenated carbon, nitrogenated carbon, or graphitic carbon is first deposited on the magnetic layer and the lubricant topcoat is applied to the protective overcoat.

9. The method according to claim 8, wherein the substrate having the magnetic layer and protective overcoat thereon is immersed in the lubricant solution for a predetermined period, slowly withdrawn therefrom at a rate of about 1 mm/sec. to about 10 mm/sec., and dried.

* * * * *